June 29, 1926.　　　　　　　　　　　　　　　　1,590,408
J. E. BELL ET AL
AIR PREHEATING SYSTEM
Filed August 15 1924
Fig. 1,
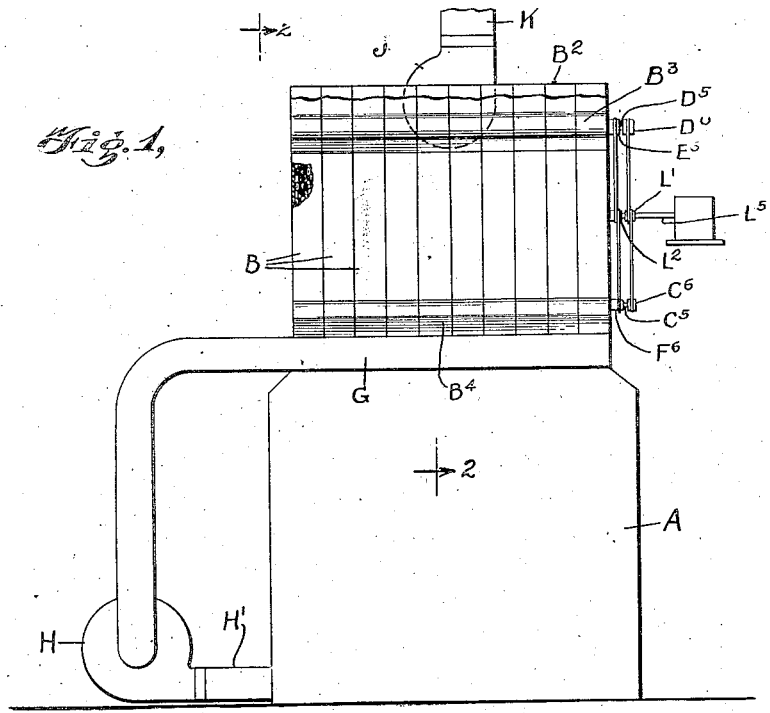
Fig. 2,
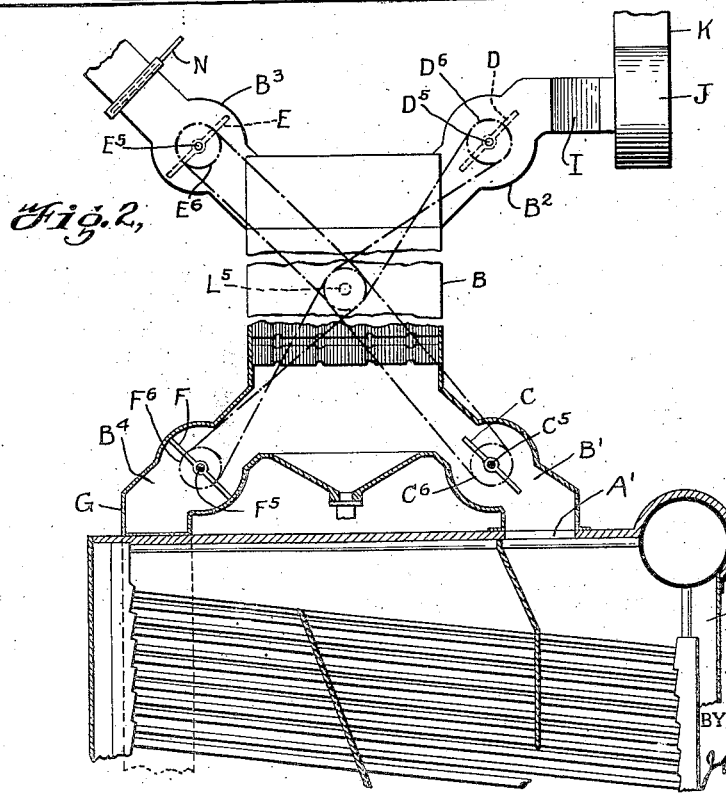
INVENTORS
John E. Bell &
BY Wyllys E. Dowd
John E. Hubbell
ATTORNEY Patented June 29, 1926.

1,590,408

UNITED STATES PATENT OFFICE.

JOHN E. BELL, OF BROOKLYN, AND WYLLYS E. DOWD, JR., OF NEW YORK, N. Y., ASSIGNORS TO POWER SPECIALTY COMPANY, OF NEW YORK, N. Y., A CORPORATION OF NEW YORK.

AIR-PREHEATING SYSTEM.

Application filed August 15, 1924. Serial No. 732,181.

The general object of our present invention is to provide an improved method of, and improved means for utilizing the heating gases leaving a furnace in preheating the air supplied to the furnace to support combustion therein. More specifically, the object of our invention is to combine with a boiler furnace suitably simple, effective and efficient means for utilizing the heating gases leaving the furnace in preheating the air supplied to the furnace for combustion, and for passing the heating gases and air through the preheater in such manner as to maintain the desired draft conditions in the boiler furnace, while at the same time maintaining pressure conditions in the preheater which will reduce to a minimum the impairment in efficiency of the plant as a whole resulting from the leakage inevitable in practical apparatus.

The various features of novelty which characterize our invention are pointed out with particularity in the claims forming a part of this specification, but for a better understanding of the invention reference should be had to the accompanying drawings and descriptive matter in which we have illustrated and described preferred embodiments of our invention.

Of the drawings:

Fig. 1 is a diagrammatic elevation; and

Fig. 2 is a section of a portion of the apparatus shown in Fig. 1, taken on the line 2—2 of Fig. 1.

In Figs. 1 and 2 of the drawings, we have illustrated the use of our invention in connection with a boiler furnace A, having associated with it a regenerative air preheater composed of a plurality of similar regenerator chambers B, through each of which heating gases and the air for combustion to be preheated flow at alternate periods, and through some of which, at any one instant, heating gases pass from the boiler to the stack K, while at the same time air for combustion is passing through other chambers B to the furnace.

In the form shown in the drawings, each regenerative chamber B comprises a heating gas inlet B' at its lower end connected to the heating gas outlet A' of the boiler and controlled by a valve C, and a heating gas outlet $B^2$ at the upper end of the chamber connecting the latter through the conduit I to the inlet of an induced draft fan J discharging into the stack K. At its upper end, each chamber B is also provided with an air inlet $B^3$ controlled by a valve E and serving when open to admit air to the chamber from the atmosphere. At its lower end, each chamber B is provided with an air outlet $B^4$ controlled by a valve F and serving when the latter is open to pass air from the regenerative chamber to a bus channel G, connected to the inlet of an induced draft fan H, the outlet H' of which is connected to the air inlet of the boiler furnace. As shown, the valves C, D, E, and F for the various chambers are all rotary valves of similar construction. All of the valves C for the various chambers B are mounted on a common shaft $C^5$ and are so angularly disposed with respect to one another that in any angular position of the shaft $C^5$ some of the valves C are open and others are closed. The sets of valves D, E, and F are mounted on shafts $D^5$, $E^5$, and $F^5$, respectively, and each set of valves is angularly displaced with respect to one another on their common supporting shaft, so that when the four shafts are rotated in unison, the valve C and the valve D for each chamber will open and close at the same instant, and the valves E and F for that chamber will be fully closed when the valves C and D are open, and will be open only when the valves C and D are fully closed.

In each chamber B between the upper and lower ends thereof, is mounted a pervious mass of regenerative material, which may be ordinary firebrick checker work, but, advantageously, is composed of specially formed metallic bars of the character disclosed in an application, Serial No. 689,443, filed January 30, 1924, by one of us, to-wit: John E. Bell. The valve shafts $C^5$, $D^5$, $E^5$, and $F^5$ are rotated in unison in the construction shown, by means of gearing comprising gears $C^6$, $D^6$, $E^6$ and $F^6$ secured to the shafts C, D, E, and F, respectively, at one end of the preheater, and co-operating gears $L'$ and $L^2$ carried by a common motor driven shaft $L^5$. The regenerative air heater shown in Figs. 1 and 2 is not our joint invention but on the contrary, is the sole invention of one of us, to-wit: John E. Bell, and is fully disclosed and claimed in the above mentioned co-pending application Serial No. 689,443 which discloses an arrangement of an air heater in association with a boiler furnace as illustrated in Figs. 1 and 2, except that in said prior application no induced draft air fan analogous to the above mentioned fan H is employed, but air is supplied to the air inlets of the regenerative chamber by a forced draft fan.

In a regenerative air preheater such as illustrated in Figs. 1 and 2 hereof, it is not possible in ordinary commercial practice to make the control valves tight enough to prevent leakage under the pressure differentials which exist at the opposite sides of the valves when the latter are closed, and indeed, in any known form of air preheater suitable for practical use in connection with a boiler furnace, there is inevitably leakage into and out of the air and gas passages. We have discovered, however, that by suitably regulating the pressure conditions in the preheater, whether it be a regenerator or a recuperator, it is possible to maintain the proper draft conditions in the boiler furnace while at the same time maintaining air and heating gas pressures in the preheater and its connections which will reduce the leakage approximately to the minimum and which will minimize the ill consequences of such leakage as does occur. The manner in which this is accomplished with the apparatus shown in Figs. 1 and 2 will now be described.

In the preferred mode of practice with the apparatus as shown in Figs. 1 and 2, the parts are so relatively proportioned and the induced draft fans H and J are so operated as to maintain the desired draft conditions in the furnace proper, and to maintain approximately the same pressure in the lower ends of the regenerated chambers when air is passing downward through the latter and when heating gases are passing upward through the chamber. If with the air entering the regenerator inlets at atmospheric pressure the draft loss in the regenerator chambers is not sufficient to reduce the air pressure at the bottoms of the chambers to approximate equality with the pressure of the heating gases in the lower ends of the regenerator chambers, the air inlets may be suitably throttled as by means of the dampers N to decrease as much as is required to secure such equality of pressures. This regulation of pressures in the air pre-heater reduces the inevitable leakage past the regenerator valves to a practical minimum. Furthermore, such leakage as may then occur will be leakage of air into the heating gases at the top of the regenerator, and such leakage impairs the efficiency of the plant as a whole less than would leakage between the air and gas passages in any other portion of the system.

An understanding of the character of the advantages obtained with the present invention may be facilitated by the following explanations: In an ordinary boiler furnace of the general character illustrated in Figs. 1 and 2, the draft suction at the heating gas outlet A' from the boiler will ordinarily be from one to two inches of water. The pressure in the combustion chamber of the furnace should ordinarily be about equal to, though preferably a trifle below the pressure of the atmosphere. The draft suction at the heating gas exit from a regenerator chamber when the latter is passing products of combustion must be appreciably lower than at the boiler outlet, especially as the desirable compactness of the regenerator, and the high gas velocity necessary to give the compact regenerator adequate capacity and efficiency requires an appreciable resistance to gas flow fluid and an appreciable draft loss in each regenerator chamber. The heating gas draft loss in the regenerator may well be equal to or even appreciably greater than the draft loss in the boiler proper. When air is passing downward through a regenerator chamber the pressure in the upper end of the chamber must inevitably be greater than the pressure in the lower end of the chamber owing to the resistance to flow of the regenerative material, and in general the draft loss in the regenerator for the descending air will be comparable to, but somewhat less than the draft loss in the regenerator for the ascending heating gases, which are greater in weight and of a higher average temperature than the air.

With the pressures in the lower ends of each regenerator chamber approximately the same with each direction of flow, and hence approximately equal to the pressure in the heating gas outlet A' of the boiler and in the bus flue G running to the inlet of the fan H, there will obviously be no appreciable leakage of air into gas or gas into air at the lower end of the chamber. At the top of the chamber, however, the valves D and E, in ordinary commercial practice, will not be tight enough to prevent leakage of air into the conduit I. The only effect of this leakage on the plant efficiency is due to the increased load put on the induced draft fan J.

Leakage of air into the heating gas at the lower end of the regenerator increases the weight of the gases to be handled by the fan J as does leakage at the top of the regenerator, and in addition adds to the load on the fan H, and in effect reduces the capacity of the regenerator, and most important of all results in a substantial heat loss. Leakage at the bottom of the regenerator of heating gases into air may in practice be somewhat less objectionable than leakage of air into the heating gases but is attended with the same sort of disadvantages.

When air leaks into the heating gases past the valves F or C at the bottom of the regenerator, the weight of the gases passing upward through the regenerator chambers is increased and the temperature of the gases in the hot end of the regenerator is reduced. The decreased initial heating gas temperature results in a lower air delivery temperature and a corresponding reduction in the amount of heat absorbed by the air. In consequence, the heating gases leaving the regenerators contain more heat than they would if the same leakage occurred at the top of the regenerator. Notwithstanding the reduction in useful heat transfer, the leakage of air into the heating gases at the bottom of the regenerator requires a larger regenerator than would be required with no leakage or with the leakage localized at the top of the regenerator, since the weight of the total air passing down through the regenerator is increased as is the weight of the upflowing heating gases by the weight of the leakage of air. The increased weight of air and heating gases flowing through the regenerator chambers also increases the air and heating gas draft losses in the regenerator and in that way increases the loads on the fan H and J.

The leakage of heating gas into the air past the valves C and F at the bottom of the regenerator does not increase the weight of air and gases passing through the regenerator directly but does so indirectly. This follows from the fact that the admixture of the inert heating gas constituents $CO_2$ and nitrogen with the air for combustion tends to a lower combustion efficiency, and in practice requires a greater amount of excess air for a given efficiency of combustion than would otherwise be needed. An increase in excess air tends to decreased efficiency of the boiler proper by increasing both the weight and the temperature of the gases leaving the boiler. This decrease in boiler efficiency is compensated for in part only by the higher temperature of the air entering the furnace which results from the heating gas leakage into the air and the higher temperature at which the heating gas enters the regenerator. The increase in the air required for combustion thus increases both the weight of air and the weight of heating gases passing through the regenerator which makes necessary a larger regenerator than would otherwise be required, increases the draft losses through the boiler and regenerator and increases the loads on the fans H and J, and in addition results in a heat loss since the total heat in the gases passing from the regenerator to the stack will be greater than if leakage were localized in accordance with the present invention.

It will be apparent, of course, that the desired furnace draft conditions may be maintained while at the same time the heating gas and air pressures at the bottom of the regenerator may be equalized in accordance with the present invention by putting an induced fan between the boiler heating gas outlet and the heating gas inlet to the regenerator and by employing a blower to put air into the regenerators under a suitable pressure which will then be above that of the atmosphere. In practice, however, space conditions ordinarily make it undesirable to place a fan between the heating gas outlet of the boiler and the regenerator, and such fan moreover would have to be larger than if placed in the heating gas outlet of the regenerator on account of the reduction in volume of the gases as they pass through the regenerator.

Where, as may sometimes be the case, the draft loss involved in moving the air through the regenerator is greater than the draft suction at the heating gas outlet of the boiler, a full attainment of the advantages of the present invention may require a blower or forced draft fan to pass air into the air inlets of the regenerators at a pressure sufficiently above that of the atmosphere to maintain equality in air and gas pressures at the bottom of the regenerator. When the air heater is a regenerator, however, we contemplate that in ordinary practice the regenerator may well be proportioned to produce an air draft loss in the regenerator sufficient to insure the desired air pressure at the bottom of the regenerator without requiring either a forced draft air feed to the regenerators or much, if any, throttling effect from the dampers N. It will be understood that with apparatus properly proportioned the draft loss for the air passing downward through the regenerators and for the heating gases passing upward through the regenerators will vary with approximate uniformity as the total weight of air and heating gases change with furnace load conditions so that if the apparatus constructed as shown in Figs. 1 and 2 is correctly proportioned for any one load condition, the proportions will be approximately correct for all other load conditions.

It will be obvious to those skilled in the art that the general advantages of the invention are not restricted to air pre-heaters of the regenerative type but apply also to air pre-heaters of the recuperative type. Although recuperators do not require reversing valves and avoid that source of leakage, in practice recuperators must be constructed with heat transfer walls so extended and of such character that leakage between the air and gas passages cannot be prevented.

While with the recuperators the leakage cannot be localized as definitely at the colder end of the preheater as in a regenerator, the same general advantages can be obtained or approximated in a recuperator as in a regenerator by regulating the air and gas pressure so as to practically eliminate leakage between the air and gas passages at the hotter end of the preheater.

While in accordance with the provisions of the statutes we have illustrated and described the best forms of our invention now known to us, it will be apparent to those skilled in the art that formal changes in apparatus and modes of operation specifically illustrated and described herein may be made without departing from the spirit of our invention, and that certain features of our invention may sometimes be used with advantage without a corresponding use of other features.

Having now described our invention what we claim as new and desire to secure by Letters Patent is:

1. In preheating air for combustion supplied to a furnace by means of a preheater in which the air absorbs heat from the heating gases leaving the furnace, the improvement which consists in subjecting the air and heating gases to draft creating effects approximately equalizing the pressure at which the air leaves the preheater with the pressure at which the heating gases enter the preheater.

2. In preheating air from combustion supplied to a boiler furnace by means of a preheater from which the air absorbs heat from the heating gases leaving the furnace, the improvement which consists in so proportioning the preheater passages and impressing such draft creating effects on the air and heating gases that air passing into the preheater at atmospheric pressure will be subject to a draft loss in passing through the preheater approximately equal to the heating gas draft loss in the boiler.

3. The combination with a boiler furnace, of an air preheater, draft creating means for drawing the heating gases from the boiler through the preheater, an induced draft fan drawing air from the preheater and discharging it into the furnace, and means regulating the pressure at which air enters the preheater whereby the air and gas pressures at the hotter end of the preheater may be equalized.

Signed at New York city, in the county of New York and State of New York this 13th day of August A. D. 1924.

JOHN E. BELL.
WYLLYS E. DOWD, Jr.